(12) United States Patent
Nithyanandam et al.

(10) Patent No.: US 9,971,343 B2
(45) Date of Patent: May 15, 2018

(54) PORTABLE INTELLIGENT CONTROLLING SYSTEM FOR MACHINES

(71) Applicants: PSG College of Technology, Coimbatore (IN); Ganesh Kumar Nithyanandam, Coimbatore (IN)

(72) Inventors: Ganesh Kumar Nithyanandam, Coimbatore (IN); Radhakrishnan Pezhinkattil, Coimbatore (IN)

( * ) Notice: Subject to any disclaimer, the term of this patent is extended or adjusted under 35 U.S.C. 154(b) by 434 days.

(21) Appl. No.: 14/333,512

(22) Filed: Jul. 17, 2014

(65) Prior Publication Data

US 2015/0293528 A1 Oct. 15, 2015

(30) Foreign Application Priority Data

Apr. 13, 2014 (IN) .......................... 1938/CHE/2014

(51) Int. Cl.
*G05B 19/418* (2006.01)

(52) U.S. Cl.
CPC .............. *G05B 19/4183* (2013.01); *G05B 2219/31322* (2013.01); *G05B 2219/33099* (2013.01)

(58) Field of Classification Search
CPC ............ G05B 19/4183; G05B 19/4145; G05B 2219/31322; G05B 2219/33099; G05B 2219/30; G05B 2219/32215; A61F 2002/30952; B23Q 15/00; B23Q 15/12
See application file for complete search history.

(56) References Cited

U.S. PATENT DOCUMENTS

| 4,974,165 A | * | 11/1990 | Locke | G05B 19/4166 318/572 |
| 5,293,024 A | * | 3/1994 | Sugahara | B23K 26/08 219/121.67 |
| 5,935,456 A | * | 8/1999 | Braunschweiler | B23H 7/065 219/69.12 |
| 2003/0046436 A1 | * | 3/2003 | Govindaraj | H04L 29/06 709/250 |
| 2010/0188035 A1 | * | 7/2010 | Abeta | B23Q 15/02 318/570 |
| 2011/0015885 A1 | * | 1/2011 | Matsubara | B23Q 17/20 702/66 |
| 2015/0290723 A1 | * | 10/2015 | Andrews | G01M 17/02 409/132 |

* cited by examiner

*Primary Examiner* — Nathan L Laughlin
(74) *Attorney, Agent, or Firm* — The Law Office of Austin Bonderer, PC; Austin Bonderer

(57) ABSTRACT

A portable plug-and-play intelligent system for monitoring and controlling process variations of a workpiece of a machine is provided. The portable plug-and-play intelligent system includes one or more sensors, a controller, a work piece, a plug & play modular fixture with a motor, a database, a comparison unit, and a control unit. The one or more sensors collect real-time data of the workpiece from the machine. The controller processes the real-time data collected from the one or more sensors. The database stores the processed real-time data. The comparison unit compares the real-time data of the workpiece with predefined specifications of the workpiece to check whether the real-time data is accurate or not. The control unit triggers the motor to allow the plug-and-play modular fixture to adjust the parameter variables of the machine to the predefined specifications of the workpiece when the real-time data is not accurate.

4 Claims, 4 Drawing Sheets

PORTABLE INTELLIGENT CONTROLLING SYSTEM FOR MACHINES

BACKGROUND

Technical Field

The embodiments herein generally relate to a system for monitoring and controlling machines, and, more particularly, to a portable plug-and-play intelligent system for monitoring and controlling machines.

Description of the Related Art

Numerical control (NC) is the automation of machine tools that are operated by precisely programmed commands encoded on a storage medium, as opposed to controlled manually via hand wheels or levers, or mechanically automated via cams alone. Most NC today is computer numerical control (CNC), in which computers play an integral part of the control. CNC machines control the functions and motions of a machine tool by means of a prepared program (NC). CNC controls the motions of a component or tool, the input parameters such as spindle speed, feed rate, depth of cut, and the functions such as coolant on or off, spindle on or off, etc. With CNC machining, the computer can control exact positioning and velocity.

CNC machines works through a program that is fed into the system and this program is used for cutting the metal/plastic parts of the job as per the requirements. All the processes and the final dimensions are entered into the system through the program. The system therefore understands what exactly requires to be done and carries out all the processes. The CNC machine operates like the Robot, which has to be installed with the program and it follows all the instructions.

When the batch manufacturing jobs are large, or the work piece is long, most of the CNC machines do not produce a consistent quality, which results in low level of production, thus results in customer's dissatisfaction.

Today, manufacturer's demands the CNC machine to produce the components to closer tolerance specifications. The CNC machines present in the market are not equipped to collect the data on-line and make the changes instantly, the changes which has to be made can only be done for the next batch which results in the inconsistency of the product. The CNC machines currently present in the market are not efficient to fulfill the need of consistency, accuracy and reliability and giving error free results.

Accordingly, there is a need of a portable plug-and-play intelligent system that monitors and controls machining/assembly operation in the machines with higher accuracy.

SUMMARY

In view of the foregoing, an embodiment herein provides a portable plug-and-play intelligent system for monitoring and controlling process variations of a workpiece of a machine. The portable plug-and-play intelligent system includes one or more sensors, a controller, a workpiece, a plug & play modular fixture with a motor, a database, and a comparison unit. The one or more sensors collect real-time data of the workpiece from the machine. The controller processes the real-time data collected from the one or more sensors. The database stores the processed real-time data. The comparison unit compares the real-time data of the workpiece with predefined specifications of the workpiece to check whether the real-time data is accurate or not. The plug-and-play modular fixture adjusts the parameter variables (e.g., a feed rate, a spindle speed, etc.) of the machine to the predefined specifications based on the real-time data of the workpiece when the real-time data is not accurate. In one embodiment, the portable plug-and-play intelligent system includes a control unit that receives a signal from the comparison unit when the real-time data is not accurate. The control unit triggers a motor to allow the plug-and-play modular fixture to adjust parameter variables of the machine when the signal is received from the comparison unit. When the real-time data is accurate, the process (e.g., a machining, and/or an assembly process) of the machine continues. In one embodiment, the control unit includes a PCX control unit. In another embodiment, the real time data includes a real-time dimension data of the workpiece. The motor may be a servo motor, or a stepper motor.

In another aspect, a portable plug-and-play intelligent system for monitoring and controlling machining process variations of a workpiece of a machine is provided. The portable plug-and-play intelligent system includes one or more sensors, a controller, a work piece, a plug & play modular fixture with a motor, a database, a comparison unit, and a control unit. The one or more sensors collect real-time data of the workpiece from the machine. The controller processes the real-time data collected from the one or more sensors. The database stores the processed real-time data. The comparison unit compares the real-time data of the workpiece with predefined specifications of the workpiece to check whether the real-time data is accurate or not. The plug-and-play modular fixture adjusts the parameter variables (e.g., a feed rate, a spindle speed, etc.) of the machine to the predefined specifications based on the real-time data of the workpiece when the real-time data is not accurate. The control unit receives a signal from the comparison unit when the real-time data is not accurate. The control unit triggers a motor to allow the plug-and-play modular fixture to adjust parameter variables of the machine when the signal is received from the comparison unit. When the real-time data is accurate, the process (e.g., a machining, and/or an assembly process) of the machine continues. In one embodiment, the control unit includes a PCX control unit, and/or a PCI control unit. The motor may be a servo motor, or a stepper motor.

In yet another aspect, a method of monitoring and controlling machining process variations of a workpiece of a machine using a portable plug-and-play intelligent system is provided. The method includes the following steps: (a) collecting, using one or more sensors, real time data of a workpiece from the machine, (b) processing, using a controller, the real-time data of the workpiece collected from the one or more sensors, (c) storing, in a database, the processed real-time data, (d) comparing, using a comparison unit, the real-time data of the workpiece with predefined specifications of the workpiece, (e) checking, whether the real-time data of the workpiece is equal to the predefined specifications of the workpiece, (f) providing a signal, using the comparison unit, to a control unit to trigger a motor to allow a plug-and-play modular fixture to adjust the parameter variables of the machine to the predefined specifications of the workpiece when the real-time data of the workpiece is not equal to the predefined specifications of the workpiece. The method may further comprise the step of continuing the machining process of the machine when the real-time data of the workpiece is equal to the predefined specifications of the workpiece. In one embodiment, the motor is a servo motor, or a stepper motor. In another embodiment, the control unit includes a PCX control unit.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
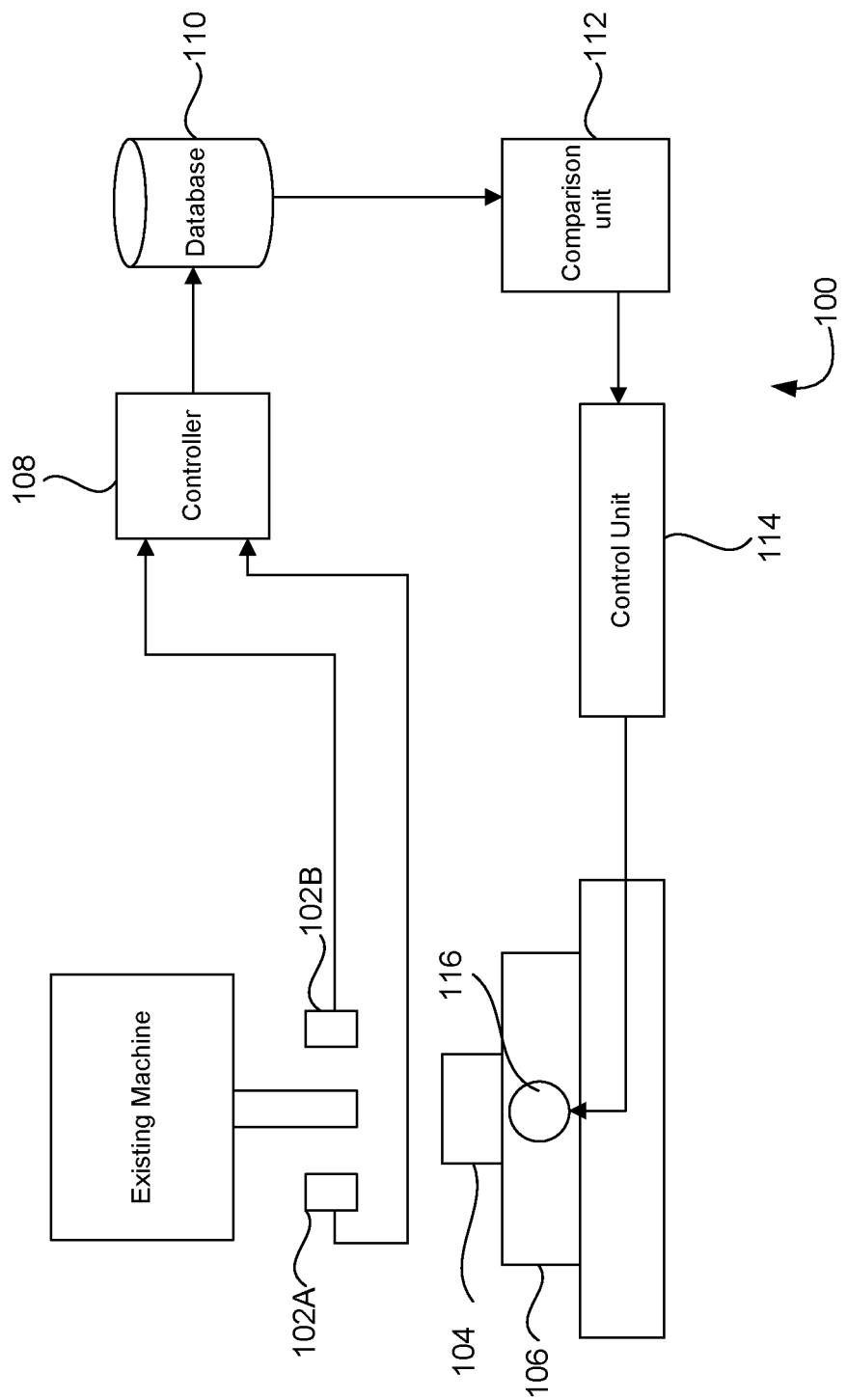
FIG. 1 illustrates a system view of a portable plug-and-play intelligent system for monitoring and controlling process variations of a workpiece of a machine according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need a portable plug-and-play intelligent system for monitoring and controlling variations in processing a workpiece. The embodiments herein achieve this by providing a portable plug-and-play intelligent system that monitors and controls variation in processing (e.g., machining, assembly, etc.) the workpiece. The portable plug-and-play intelligent system includes one or more sensors, a work piece, a plug & play modular fixture with a motor, a controller, a database, a comparison unit, and a control unit. The one or more sensors collect the real-time dimensional data of the workpiece when the workpiece is machined on the machine (e.g., computer numerical control (CNC) machines). The controller receives the real-time dimensional data from the one or more sensors and processes the real-time dimensional data. The processed real-time dimensional data is stored in a database. The database may also store the predefined specifications of the workpiece. The comparison unit compares the stored real-time dimensional data with the predefined specifications (e.g., predefined dimensional data, predefined customer specification, etc.) to determine a difference between the real-time dimensional data and the predefined dimensional data of said workpiece. The comparison unit provides a signal to the control unit, based on the difference between the real-time dimensional data and the predefined dimensional data of said workpiece. The control unit triggers the motor to allow the plug & play modular fixture to adjust the parameter variables of the motor to obtain the workpiece with predefined specifications. When there is no difference between the real-time dimensional data and the predefined dimensional data of the workpiece, the machining, and/or assembly process of the CNC machines continues. Referring now to the drawings, and more particularly to FIGS. 1 through 4, where similar reference characters denote corresponding features consistently throughout the figures, there are shown preferred embodiments.

FIG. 1 illustrates a system view of a portable plug-and-play intelligent system that is mounted on a conventional functional computer numerical control (CNC) machine for monitoring and controlling process variations of a workpiece of a machine according to an embodiment herein. The portable plug-and-play intelligent system 100 includes one or more sensors 102A-B, a workpiece 104, a plug-and-play modular fixture 106, a controller 108, a database 110, a comparison unit 112 and a control unit 114. The one or more sensors 102A-B collects the real-time data (e.g., real-time dimensional data) of the workpiece 104 when the workpiece 104 is machined on the machine (e.g., a conventional functional CNC machine). The one or more sensors 102A-B is coupled to the conventional functional CNC machine to collect the real-time dimensional data of said workpiece 104. The plug-and-play modular fixture 106 that holds the workpiece 104 includes a motor 116. In one embodiment, the motor 116 is a servo motor, or a stepper motor. In another embodiment, the plug-and-play modular fixture 106 may be mounted on the conventional functional CNC machine. The controller 108 receives the real-time dimensional data of the workpiece 104 from the one or more sensors 102A-B and processes the collected real-time dimensional data. In one embodiment, the controller 108 is communicatively coupled to the one or more plurality of sensors 102A-B. The processed real-time dimensional data is stored in the database 110. The database 110 may also store the predefined specifications of the workpiece 104. The comparison unit 112 is communicatively coupled to the database 110. The comparison unit 112 compares the processed real-time dimensional data of the workpiece 104 (e.g., a rib component) with the predefined specifications (e.g., predefined dimensional data, predefined customer specification, etc.) of the workpiece 104 to determine a difference between the real-time dimensional data and the predefined dimensional data of the workpiece 104. The comparison unit 112 sends a signal to the control unit 114 based on the difference between the real-time dimensional data and the predefined dimensional data of the workpiece 104. The control unit 114 is communicatively coupled to the comparison unit 112. The control unit 114 triggers the servo motor 116 to allow the plug-and-play modular fixture 106 to adjust the parameter variables (e.g., a feed rate, a spindle speed, etc.) of the servo motor to obtain the workpiece 104 with the predefined specifications, when the signal is received. In other words, the plug-and-play modular fixture 106 is moved perpendicular to the dimension of the workpiece 104 by adjusting the parameter variables (e.g., a feed rate, a spindle speed, etc.) of the servo motor. When there is no difference between the real-time dimensional data and the predefined dimensional data of the workpiece 104, the process (e.g., a machining and/or an assembly process) of the conventional functional CNC machine continues. In one embodiment, the control unit 114 may be a Peripheral Component Interconnect (PCI) control unit. The portable plug-and-play intelligent system 100 monitors and controls machining process variations of the conventional functional CNC machine, in one example embodiment.

Figure 2:
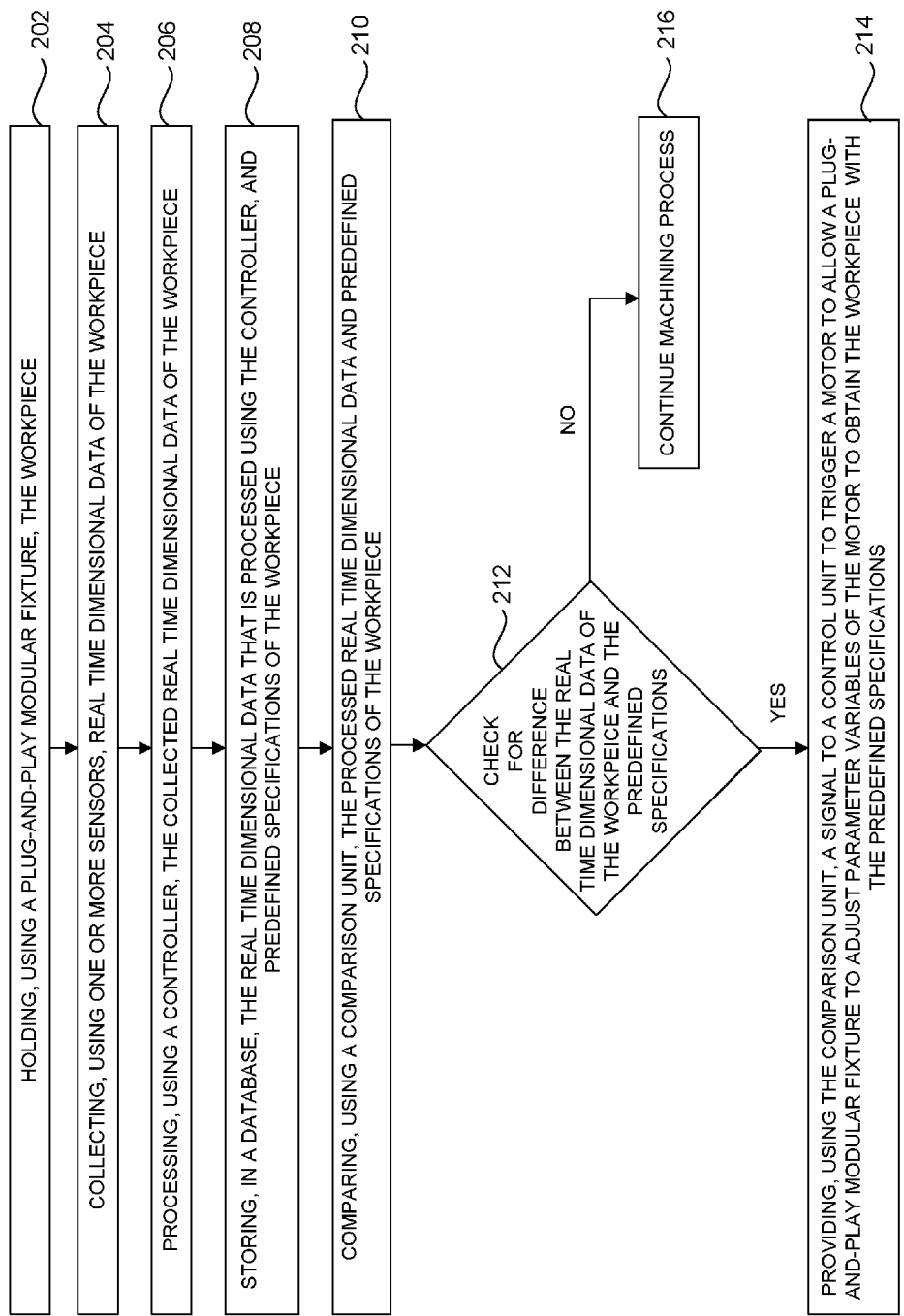
FIG. 2 is a flow diagram illustrating a method of monitoring and controlling process variations of a workpiece of a machine using a portable plug-and-play intelligent system of FIG. 1 according to an embodiment herein.

FIG. 2 is a flow diagram illustrating a method of monitoring and controlling process variations of a workpiece of a machine using a portable plug-and-play intelligent system 100 according to an embodiment herein. In step 202, the workpiece 104 is hold by the plug-and-play modular fixture 106. The plug-and-play modular fixture 106 may be mounted on a computer numerical control (CNC) machine for machining the workpiece 104. In step 204, the real-time data (e.g., real-time dimensional data) of the workpiece 104 (e.g., a rib component) is collected from the CNC machine using one or more sensors 102A-B when the workpiece 104 is machined on the CNC machine. In step 206, the collected real-time dimensional data of the workpiece 104 is processed using the controller 108. In step 208, the processed real-time dimensional data and predefined specifications of the workpiece 104 is stored in a database 110. In step 210, the processed real-time dimensional data of the workpiece 104 is compared with predefined specifications of the workpiece 104 (e.g., predefined dimensional data, predefined customer specification, etc.) using the comparison unit 112. In step 212, checking for a difference between the collected real-time dimensional data of the workpiece 104 and the predefined specifications (e.g., predefined dimensional data, predefined customer specification, etc.). If yes, providing a signal, using the comparison unit 112, to a control unit 114 to trigger the motor 116 to allow the plug-and-play modular fixture 106 to adjust one or more parameter variables (e.g., a feed rate, a spindle speed, etc.) of the motor to obtain the workpiece 104 with the predefined specifications (e.g., predefined workpiece dimensional data), in step 214. If no, the process (e.g., a machining, and/or an assembly process) of the CNC machine continues, in step 216. In one embodiment, the motor is a servo motor, or a stepper motor.

Figure 3:
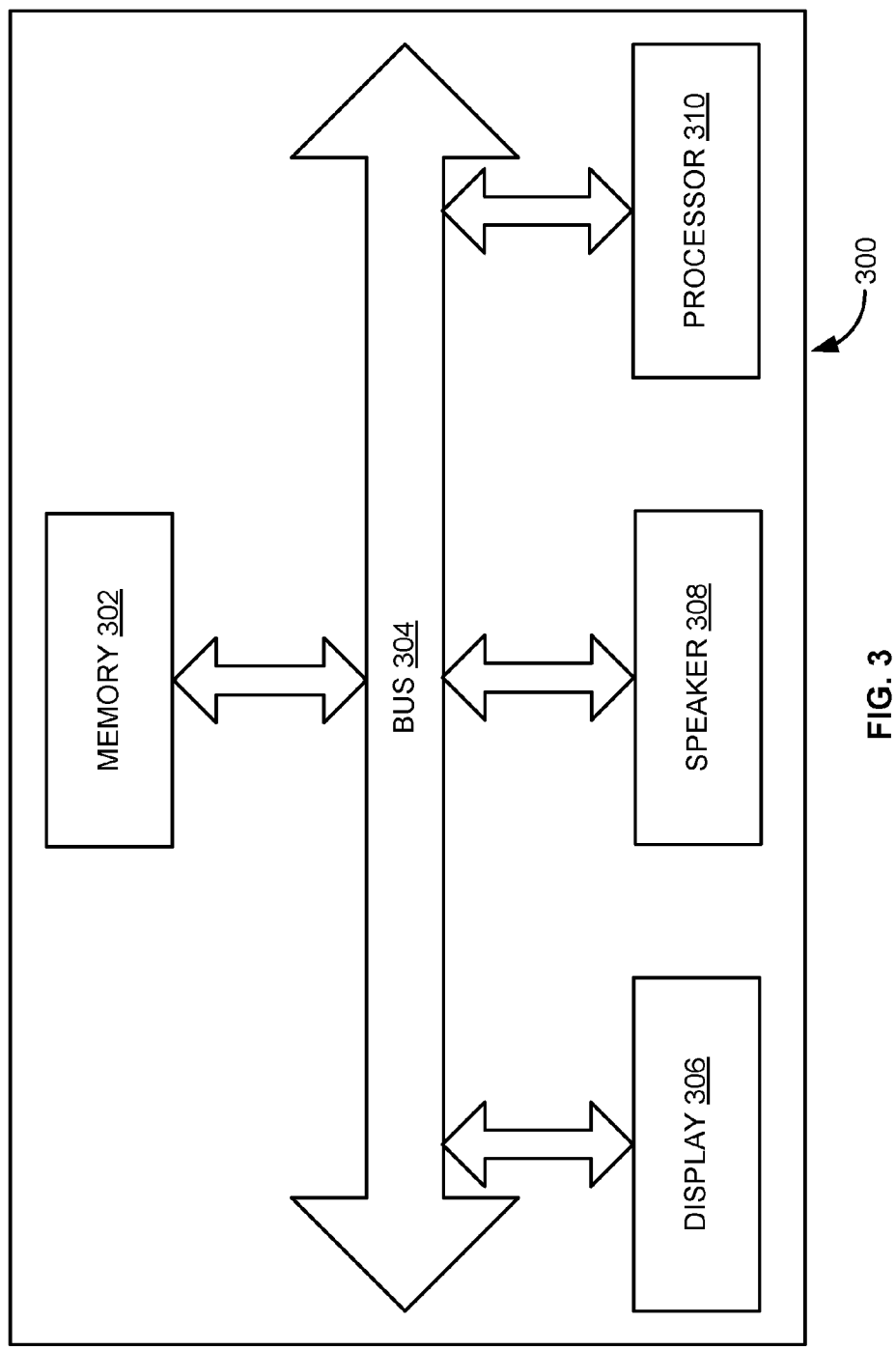
FIG. 3 illustrates a schematic diagram of a receiver according to an embodiment herein.

FIG. 3 illustrates a schematic diagram 300 *s* of the control unit 114 of FIG. 1 according to an embodiment herein. The control unit 114 includes a memory 302 that having a set of instructions, a bus 304, a display 306, a speaker 308, and a processor 310 that is capable of processing the set of instructions to perform any one or more of the methodologies herein. The processor 310 may also enable digital content to be consumed in the form of video for output via one or more displays 306 or audio for output via speaker and/or earphones 308. The processor 310 may also carry out the methods described herein and in accordance with the embodiments herein.

Digital content (e.g., the count) may also be stored in the memory 302 (e.g., a counter) for future processing or consumption. The memory 302 may also store program specific information and/or service information (PSI/SI), including information about digital content (e.g., the detected information bits) available in the future or stored from the past. A user of the portable plug-and-play intelligent system 100 may view this information on the display 306 and select an item of for viewing, listening, or other uses via input, which may take the form of keypad, scroll, or other input device(s) or combinations thereof. When digital content is selected, the processor 310 may pass information. The content and PSI/SI may be passed among functions within the receiver using the bus 304.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
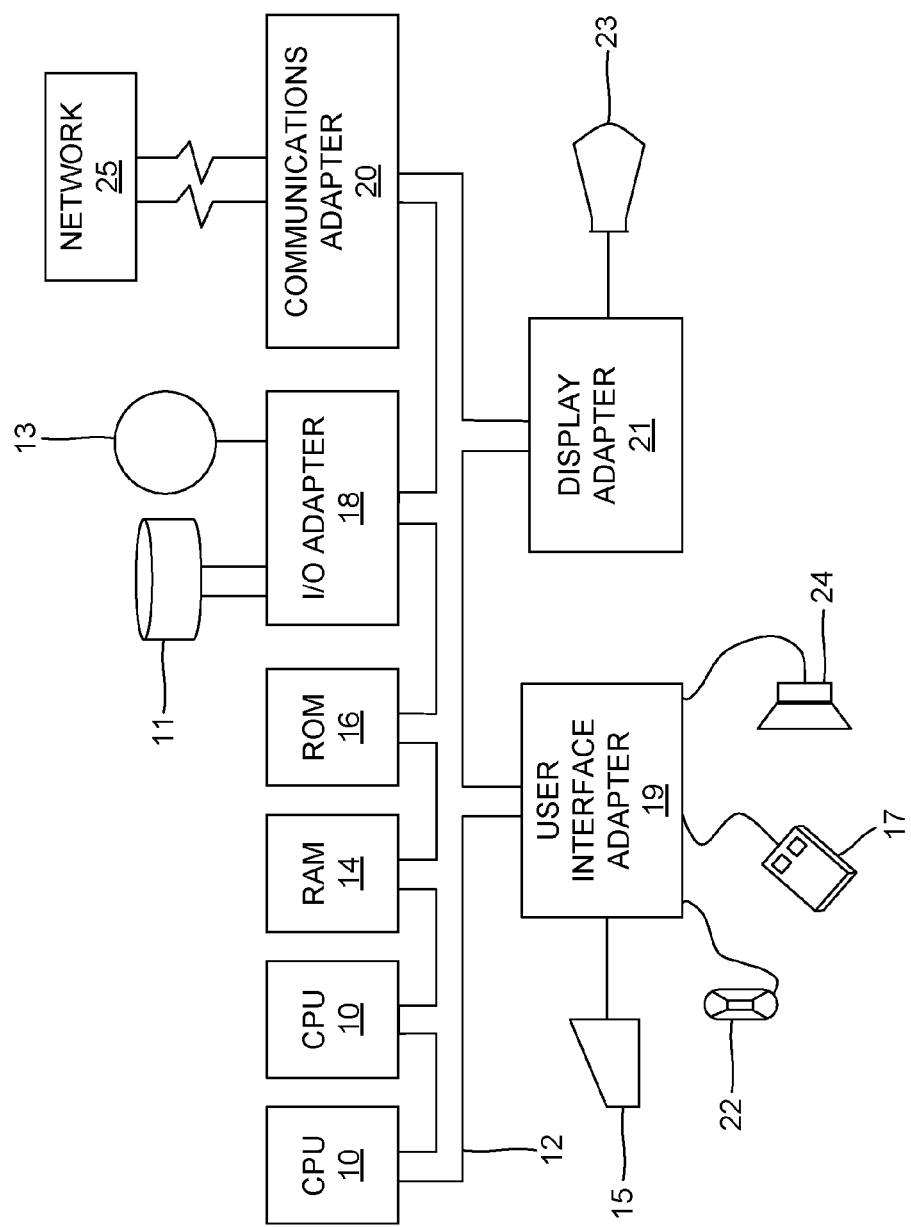
FIG. 4 illustrates a schematic diagram of a computer architecture used in accordance with the embodiments herein.

A representative hardware environment for practicing the embodiments herein is depicted in FIG. 4. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The portable plug-and-play intelligent system 100 collects the real-time dimensional data from the workpiece 104 and compares with the predefined specifications of the workpiece 104 for determining a difference between the real-time dimensional data and predefined specifications of the workpiece 104. The portable plug-and-play intelligent system 100 monitors the workpiece 104 of the machines precisely and accurately on consistent basis even though the workpiece 104 is long and thick. The portable plug-and-play intelligent system 100 controls and monitors the process variation of the workpiece 104 of the machine. The portable plug-and-play intelligent system 100 may easily mount on any existing machine such as CNC machine.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An apparatus for monitoring and controlling dimensional variations in machining process of a workpiece, comprising:
    a portable plug-and-play intelligent system that comprises
        a plug-and-play modular fixture that holds a workpiece, wherein said plug-and-play modular fixture is mounted on a conventional functional computer numerical control (CNC) machine, wherein said workpiece is machined by said conventional functional computer numerical control (CNC) machine, wherein said conventional functional CNC machine comprises:
            a cutting tool that machines said workpiece; and
            a first servo motor, wherein said cutting tool is controlled by said first servo motor for machining said workpiece;
        a plurality of sensors that is coupled to said conventional functional CNC machine to collect dimensional data of said workpiece at real-time when said workpiece is machined on said conventional functional CNC machine, wherein said real-time dimensional data of said workpiece is communicated to said portable plug-and-play intelligent system, wherein said portable plug-and-play intelligent system comprises;
            a controller that is communicatively coupled to said plurality of sensors, wherein said controller processes said real-time dimensional data collected from said plurality of sensors;
            a database that stores said real-time dimensional data that is processed and predefined specifications of said workpiece, wherein said predefined specifications of said workpiece comprises predefined dimensional data of said workpiece;
            a comparison unit that is communicatively coupled to said database, wherein said comparison unit compares said real-time dimensional data of said workpiece with predefined dimensional data of said workpiece in real time to determine a difference between said real-time dimensional data and said predefined dimensional data of said workpiece; and
            a control unit that is communicatively coupled to said comparison unit, wherein said control unit receives a signal from said comparison unit based on said difference between said real-time dimensional data of said workpiece and said predefined dimensional data of said workpiece, wherein said control unit triggers a second servo motor of said plug-and-play modular fixture and adjusts parameter variables of said second servo motor in real time to obtain said workpiece with said predefined specifications.

2. The apparatus of claim 1, wherein said control unit comprises a Peripheral Component Interconnect (PCI) control unit.

3. The apparatus of claim 1, wherein said parameter variables of said second servo motor is selected from at least one of (a) a feed rate of said second servo motor, and (b) a spindle speed of said second servo motor.

4. A method of monitoring and controlling dimensional variations in machining process of a workpiece using an apparatus, wherein said apparatus comprises a portable plug-and-play intelligent system, wherein said method comprising:
    holding, using a plug-and-play modular fixture of said portable plug-and-play intelligent system, a workpiece, wherein said plug-and-play modular fixture is mounted on a conventional functional computer numerical control (CNC) machine, wherein said workpiece is machined by said conventional functional computer numerical control (CNC) machine, wherein said conventional functional CNC machine comprises:
        a cutting tool that machines said workpiece; and
        a first servo motor, wherein said cutting tool is controlled by said first servo motor of for machining said workpiece;
    collecting, using a plurality of sensors, dimensional data of said workpiece at real time when said workpiece is machined on said conventional functional CNC machine, wherein said real-time dimensional data of said workpiece is communicated to said portable plug-and-play intelligent system;
    processing, using a controller of said portable plug-and-play intelligent system, said real-time dimensional data of said workpiece collected from said plurality of sensors;
    storing, in a database of said portable plug-and-play intelligent system, said real-time dimensional data that is processed using said controller and predefined specifications of said workpiece, wherein said predefined specifications of said workpiece comprises predefined dimensional data of said workpiece;
    comparing, using a comparison unit of said portable plug-and-play intelligent system, said real-time dimensional data of said workpiece with said predefined dimensional data of said workpiece in real time to determine a difference between said real-time dimensional data of said workpiece and said predefined dimensional data of said workpiece;
    providing, using said comparison unit, a signal to a Peripheral Component Interconnect (PCI) control unit based on said difference between said real-time dimensional data of said workpiece-and said predefined dimensional data of said workpiece;
    triggering, using a control unit of said portable plug-and-play intelligent system, a second servo motor of said plug-and-play modular fixture based on said signal; and
    adjusting parameter variables of said second servo motor in real time to obtain said workpiece with said predefined specifications, wherein said parameter variables of said second servo motor is selected from at least one of (a) a feed rate of said second servo motor, and (b) a spindle speed of said second servo motor.

* * * * *